Dec. 1, 1964  I. RUBENSTEIN  3,159,492
DRY MILK POWDER MIXTURE AND METHOD AND
APPARATUS FOR MAKING THE SAME
Filed Feb. 28, 1963
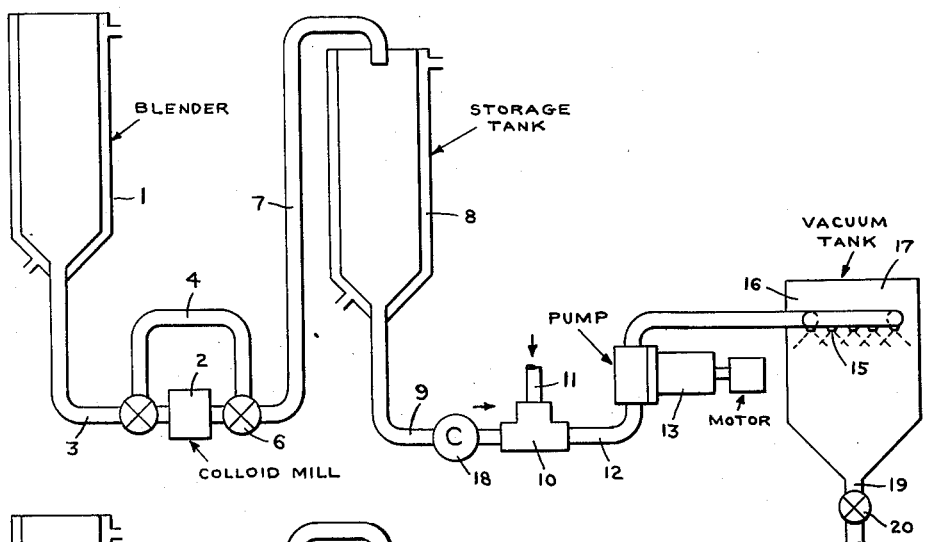
FIG. 1
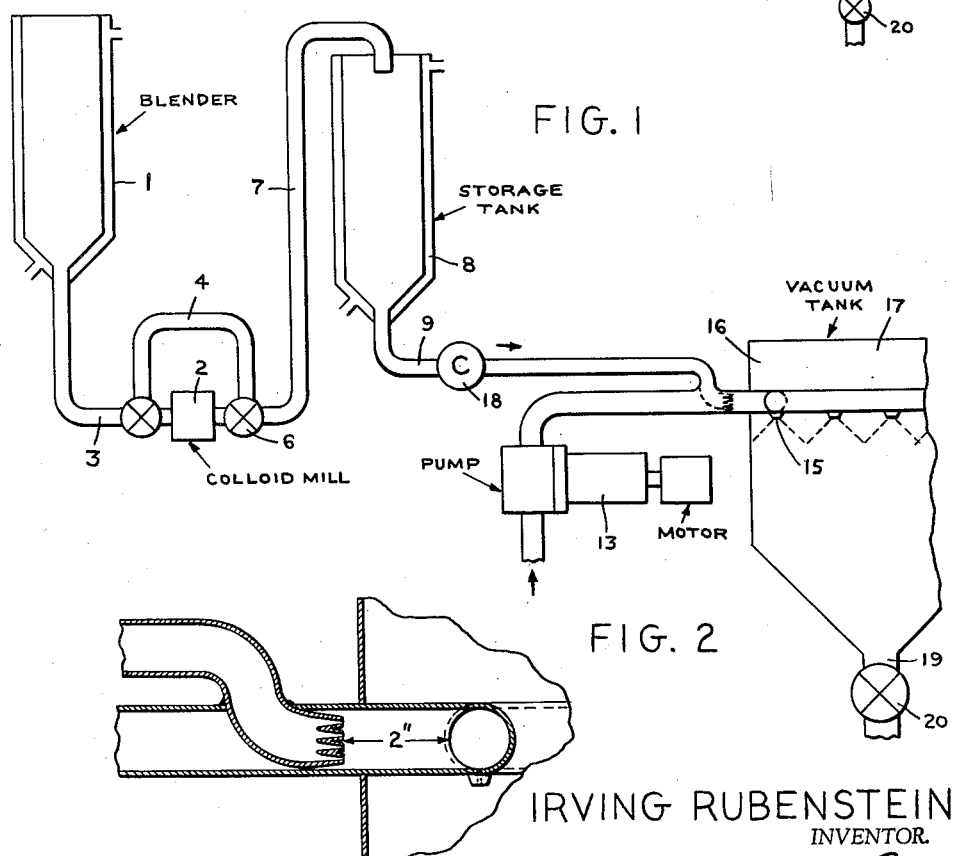
FIG. 2
FIG. 3
IRVING RUBENSTEIN
INVENTOR.
BY Daniel R. Bobis
Atty United States Patent Office 3,159,492
Patented Dec. 1, 1964

3,159,492
DRY MILK POWDER MIXTURE AND METHOD AND APPARATUS FOR MAKING THE SAME
Irving Rubenstein, Staten Island, N.Y., assignor to Weissglass Gold Seal Dairy Corp., Staten Island, N.Y., a corporation of New York
Filed Feb. 28, 1963, Ser. No. 261,671
5 Claims. (Cl. 99—203)

This invention relates generally to a dry milk powder mixture and more particularly to a method to permit the addition to or joinder with the concentrated skimmed milk from which the dry milk powder mixture is formed of phosphate salts, sulphate salts, and vitamins or combinations of these ingredients. It is a continuation-in-part of my co-pending application Serial No. 48,618, filed August 10, 1960, now abandoned.

The problem overcome by this invention is best understood with reference to a known process, for example, the manufacture of ice cream.

In the manufacture of ice cream one of the ingredients of the mixture from which the ice cream is made is dry milk powder. When the ice cream mixture including the dry milk powder is whipped and frozen there sometimes occurs what is termed in the trade a "butter churning" effect in that the globules of butter fat in the reconstituted dry milk powder coalesce and form macroscopic particles of butter fat, which condition produces an adverse effect on the taste and texture of the final product obtained. This occurs either in the making of hard ice cream or in the making of soft ice cream as exemplified by the well known "Dairy Queen" and other soft ice cream products.

In the case of the soft ice cream products the re-whipping of the mixture to bring it back to proper consistency in the machine will produce this so-called "butter churning" effect.

Heretofore to prevent this "butter churning" effect ice cream manufacturers added phosphate salts to the ice cream mix prior to the pasteurization and freezing of the mix. This was done because it was found that phosphates tended to delay this "butter churning" effect.

Heretofore no known method has been developed for admixing these salts with the ingredients from which the ice cream mix is made, hence the addition of phosphate salts, etc. was an ingredient separate and distinct from the other ingredients incorporated in the ice cream mixture.

With this technique of addition, the salt was often added by the operator in proportions improper to the desired ratio of milk solids, sometimes due to improper calculations but more often due to the lack of knowledge in understanding the character of the milk protein which changes with the season of the year. For example, the amount of phosphate salt needed in the Spring when the cows are eating grass would be much less than the amount used when the cows are eating dry feed mixtures.

The present invention provides a solution to the problem by providing not only a method of adding or admixing phosphates, and other substances to one of the ingredients of the ice cream mix, namely, the dry milk powder, but also provides a mixture which is more effective than those used by the prior art.

It depends for its effectiveness on the general rule of chemistry that salts and other substances in solution are uniformly dispersed therein and that on addition to solutions the solute of the salt or other substance will disperse itself uniformly through the combined mixture of solutions.

Thus the present invention covers a process for mixing additives to concentrated skim milk, particularly salts, but inclusive of other edible substances prior to the formation of the dry milk powder mixture characterized by the fact that as the heated concentrated skim milk is pumped under 400 p.s.i.g. to a vacuum chamber for forming therefrom the dry milk powder mixture, the desired additive preheated or relatively cold is metered instantaneously or approximately so into the concentrated skim milk; the mixed blend of additives and concentrated skim milk being atomized at the vacuum chamber nozzles at a pressure such that the temperature of the atomized mixture is about 145° F. and the final homogeneous dry powder mixture is deposited in the chamber at about 225° F.

Further objects and advantages of the invention will become evident from the following description with reference to the accompanying drawings, in which:

FIGURE 1 is a diagrammatic flow chart of one apparatus for accomplishing the present process where hot stock solutions are utilized.

FIGURE 2 is a diagrammatic flow chart of another apparatus for accomplishing the present process where cold stock solutions are utilized.

FIGURE 3 is an enlarged view of the additive outlet in the main delivery line for the apparatus shown in FIGURE 2.

Referring to the diagrammatic sketch showing the apparatus for mixing and adding the desired ingredients, we find a blender 1 of which there are many well known types easily purchasable on the open market. The blender will be of a type which permits solution introduced into the blender to be held at a temperature of at least 180 degrees at atmospheric pressure.

In this method, the particular salt mixture or nutrient mixture which is to be added or admixed with the concentrated skim milk will be made into solution by adding them to the water in the blender. Since it is difficult to get this mixture of salts or nutrients and water into solution, the solution will be channelled for about 15 minutes from the blender 1 through a colloid mill 2 to which the blender is connected as by line 3 and bypass lines 4 until all the particles of the ingredients added to the water are broken up and a clear solution is obtained. The three-way valves 5 and 6 disposed on opposite sides of the colloid mill and bypass line will be adjusted to permit the flow of fluid from the blender through the colloid mill until this desired result is obtained.

After the blending step the fluid is passed from the blender 1 through line 3 and colloid mill 2 to the connecting line 7 from whence it is discharged into a reservoir or storage tank 8.

The storage tank 8 is in turn connected by line 9 to a T-connection 10 in turn connected by lines 11 and 12 to a source of concentrated skim milk and a metering pump 13, respectively. The pump 13 communicates through line 14 and nozzle arrangement 15 with the chamber 16 formed in a vacuum tank 17.

The pump will be a special type of metering pump familiar to those skilled in this particular art so that the combined mixture of concentrated skim milk and the ingredient added thereto will be delivered to the vacuum tank 17 at high pressure. When the high pressure mixture of skim milk and additive expands into the vacuum tank it will "flash" evaporating off the water vapor which is removed along with the noncondensible gases by the mechanism for maintaining the reduced pressure in the vacuum tank 17 and the milk solids and the additive will drop by gravity to the lower section of the chamber 16.

To facilitate the evaporation process the storage tank is also maintained at a temperature of about 180° F. and the concentrated skim milk fed through pipe 11 will be brought in at a temperature of approximately 165° F. so that the pressurized solution or mixture of concentrated skim milk and the ingredient added will enter vacuum tank 17 at an elevated temperature to increase "flashing."

A check valve as at 18 will act to prevent backflow in the line 9 and will also meter a given quantity of the ingredient to be added to the concentrated skim milk so that the final dry skim milk product or mixture formed in the vacuum tank 17 will have the desired proportion of ingredients.

The dry skim milk products formed in the vacuum tank will be drawn off through the outlet 19 controlled by the valve 20 at the lowermost section of the vacuum tank. Vacuum tanks of this type are well known in the art and hence not more fully described in the present application.

The dry milk powder and additive are then passed through the remaining steps of a standard dry milk powder system, and the final product is packaged in convenient quantities for the uses to which it will be put.

In order to illustrate the ingredients added to the blender one of the mixtures can be that of phosphate salts. For example, it has been found that a combination of tetrasodiumpyrophosphate, $Na_4P_2O_7(10H_2O)$, and disodium acid phosphate, $Na_2HPO_4$, added in crystalline form in equal quantities by weight will provide one phosphate solution having the desired pH for addition to concentrated skim milk in the method and apparatus above described. Specific illustration of the proportion of this particular salt to the concentrated skim milk will be given in the illustration below.

For certain other processes a calcium sulphate salt, $Ca_2SO_4(4H_2O)$, may be utilized to form the desired solution. In the case of sulphate salts which are relatively insoluble a stock solution mixture more fully described below can be made up with hot water at 180° F. and when this mixture is passed through the colloid mill a fine homogeneous suspension will result that will yield a uniform final product when metered into the concentrated skim milk in accordance with the present invention.

In some cases it may be desirable to add nutrients, vitamins or mineral salts either alone, in combination with each other or with the respective phosphate, or sulphate salts to provide in the final dry milk powder product a mixture of ingredients which can be put to a multitude of uses and applications.

For example, it is advisable to add vitamin C to milk because this vitamin is lost during pasteurization due to the instability of vitamin C at high temperatures. The present invention by utilizing a cold stock solution of vitamin C as hereinafter described provides means for introducing this additive to obtain an ultimate final product which is high in vitamin C content with a minimum loss of vitamin C during the formation of the dry milk powder mixture.

*Dry Milk Powder Mixture Including Phosphate Salts*

As above indicated, one of the ingredients which can be added or admixed with the concentrated skim milk prior to the drying step will be phosphate salts added to the water in equal quantities by weight.

This type mixture is particularly adapted for use in the machines and process of making soft ice cream and it has been found that if the dry milk powder utilized has phosphate salts added so that the salts represent 2% of the dry weight of the final dry milk powder mixture that this mixture will provide the desired results.

When the phosphate salt additive represents 2% of the dry weight of the dry milk powder mixture then an ice cream mix will be produced having only .2% phosphate salt additive, which percentage is materially below that heretofore utilized to accomplish the same results. Even more important, however, is the fact that this lesser concentration produces an ice cream mix having a superior taste and texture than that obtained by prior art methods which utilize this ingredient.

In order to obtain the stock solution to be metered from the storage tank into the concentrated skim milk the above percentages must be kept in mind for the specific application of soft ice cream mix. It will be understood, however, that these percentages can be varied between 2%–5% by weight where the dry milk powder is applied to other processes. In each application empirical methods will develop this information.

To illustrate, the formation of the dry milk powder mixture in one system where 5000 lbs. per hour of concentrated skim milk is pumped into the vacuum tank 17 to produce 2100 lbs. of dry milk product we calculate the stock solution as follows:

To obtain an approximate 2% by weight of phosphate salt additive for 2100 lbs. of dry milk product will require approximately 44 lbs. of phosphate salts.

There will be certain limitations on the quantity of liquid metered from the storage tank with the concentrated skim milk because of the capacity of the machinery used in the formation of the dry milk powder product.

If a mixture of 11 lbs. of tetrasodiumpyrophosphate and 11 lbs. of disodium acid phosphate making a total of 22 lbs. of salt is mixed with water, for each 10 gallons of solution formed the storage tank will have 2.2 lbs. of mixed phosphate salt per gallon.

To obtain 44 lbs. of salts by dry weight from this solution it will be necessary to meter 20 gallons per hour of this stock solution from the storage tank and deliver it in proportion to the prorate quantity of concentrated skim milk delivered by the pump 13 to the vacuum tank 16.

In this particular concentration of dry milk powder mixture and phosphate salts, it was found in a comparison test that the mix will go one hour before there is any evidence of the "butter churning" effect. An ice cream mixture utilizing a dry milk powder without the additive will break down in 15 minutes and an ice cream mixture utilizing .2% phosphate salts added independently of the dry milk powder will break down in 20 minutes, and if the phosphate percentage is increased to .8% in this independent addition process to obtain the equivalent breakdown results obtained by this mixture, the tests and texture of the final ice cream mix will be poor, because of the flavor masking effect of the salts and the final "slump" of the mixture.

*Other Applications of Dry Milk Powder Mixture Including Phosphate Salts*

By varying the percentage phosphate salts in the dry milk product mixture the dry milk product mixture can be utilized in other applications.

For example, in the manufacture of sausage the law permits up to 3½% by weight of the total weight of the sausage to be dry milk product.

However, it is known that dry milk product will absorb a certain amount of moisture.

It has been found that a dry milk powder mixture having phosphate salts at .5% by weight of the dry milk product mixture, will absorb 50% more moisture than the standard dry milk product heretofore and in addition will inhibit the separation of fat particles from the sausage mixture.

Similarly in the manufacture of milk chocolate utilizing a dry milk powder mixture with a .5% phosphate salt additive, it was found that the final product developed distinct and desirable flavor qualities.

*Dry Milk Powder With Sulphate Salt*

Sulphate salts have been utilized to stiffen ice cream and it is also known that calcium sulphate salts produce exactly the reverse results of the phosphate salts. In some instances in the manufacture of hard ice cream where the whipping and freezing process does not tend to produce a "butter churning" effect this type ingredient is desirable.

In order to obtain a .2% additive in the final ice cream mix, where 10% of dry milk powder mixture is utilized, it is necessary to have a dry milk powder mixture with 2% by weight of calcium sulphate salts.

This is obtained by making a stock soluiton having 22 lbs. of calcium sulphate, $Ca_2SO_4(4H_2O)$ per 10 gallons of solution or 2.2 lbs. of calcium salt per gallon.

Once again as in the case of the phosphate salts where 5000 lbs. per hour of concentrated skim milk make 2100 lbs. of dry milk product, 44 lbs. of calcium salts will be needed to give the desired 2% concentration. In terms of solution this will be 20 gallons per hour of the above stock solution which must be metered proportionately with the 5000 lbs. per hour of concentrated skim milk.

It will be understood by those skilled in this art that the range of the sulphate salts is similar to that of the phosphate salts hence they can be varied between 2% to 5% by weight of the dry milk powder mixture depending on the ultimate use of the dry milk powder mixture with this additive.

Dry Milk Powder Mixture With Vitamin C

Substances such as vitamin C, mineral salts, nutrients, and other whole ingredients which are not harmful for human consumption are well known in this art, are purchasable on the open market and are therefore not more fully described as they do not in this regard constitute part of the invention.

It is only the addition or use of these products with the dry milk powder mixture which is important to the present process.

Where these substances can be brought into solution by addition thereof to a hot aqueous solution such as above described for phosphate and sulphate salts the same procedures can be followed except that the quantities of the ingredients will be varied in accordance with recognized methods of making solutions so as to produce in the final dry milk powder product additives in a ratio consonant with the ultimate use of the dry milk powder mixture.

Some of these substances however may not be stable under high temperatures as, for example, vitamin C indicated above. In these cases it is necessary to work with a cold (room temperature) stock solution and to reduce the time additives and hot concentrated skim milk will be mixed together before they are atomized in the vacuum chamber to form the desired final dry milk powder mixture.

For example, in order to obtain a vitamin C content of 50 mg. per quart in reconstituted milk the final dry milk powder mixture used for this purpose should contain 550 mg. of vitamin C per pound. This is equivalent to a dry milk powder mixture having 1.2% by weight of vitamin C.

In order to achieve this mixture the cold stock solution of vitamin C is prepared by adding 10 pounds of vitamin C, ascorbic acid, per 10 gallons of water or 1 pound of vitamin C per gallon.

The cold vitamin C mixture or solution will be passed through the blender then transferred into the reservoir or storage tank from which it is fed into the final line delivering the concentrated skim milk to the nozzles of the vacuum chamber.

The metering of the cold stock solution is changed slightly as shown in FIGURE 2 of the drawings.

In the form of the apparatus for the present process as shown in FIGURE 2 parts which are identical to those in the apparatus of FIGURE 1 are given the same number.

In FIGURE 2 the vitamin C stock solution is metered through line 20 into the high pressure line connected to the nozzles in the vacuum chamber at a point two (2) inches from the nozzle of the vacuum chamber. Line 20 is subdivided into 3 outlet means as at 23, 24 and 25 to assist in the proper distribution of the vitamin C solution into the concentrated skim milk before the evaporation step in the vacuum chamber.

In the case of a substance unstable to heat a larger percentage of the additive is utilized because even in the short distance shown in the form of the apparatus of FIGURE 2 a portion of the additive will be lost and further additive will be lost because of the high prevailing temperatures in the vacuum chamber.

With the stock solution above described vitamin C will be added in a ratio of 200 mg. of vitamin C per pound of hot concentrated skim milk. In the short period of travel as above described and in further processing approximately 25% of this additive is lost. This loss is considered minimal to the loss that would occur if the vitamin C were added at any other point in the hot stock solution system of FIGURE 1.

The ultimate result however is to provide a final product which contains 850 mg. of vitamin C per pound of dry milk product and this provides the 50 mg. of vitamin C per quart of reconstituted milk which is the desired minimum quantity to supply the dietary requirements of human beings by U.S.P. standards.

It may be further noted that the arrangement of FIGURE 2 is not necessary where the stock solution of additives used is a hot solution. Where the solution is hot the mixture of additives and concentrated skim milk is allowed to travel several feet so that the turbulence during such travel will provide a good admixture before the solution passes through the nozzles of the vacuum drier for evacuation. However, even when this occurs since these mixtures are being passed to the nozzles of the vacuum chamber at high pressure the rate of time between addition of the additive and the step of evaporation is substantially instantaneous for all purposes because of the rapid and uniform dispersion which occurs as a function of the solution technique.

When the above substances or other substances are admixed with the concentrated skim milk in the same manner as above described a homogeneous mixture is obtained.

This homogeneous mixture is extremely advantageous because it is adopted to be made up either into a liquid form or as an "instant" type product in crystalline form, both of which are easily utilized by the ultimate consumer.

A dry milk powder with nutrients, vitamins and mineral salts can be made up into a liquid form which has the additives distributed uniformly therethrough, for example, as a liquid suspension by mixing the dry milk powder and additive with water, and a stabilizer such as carboxymethylcellulose and carrageenan. This mixture is reasonably stable and can be bottled and sold for direct use in accordance with the conditions of the particular diet in which the mixture is used as a food supplement.

It will be understood by those skilled in the art that when made up as a food supplement the stock solution used will have concentrations of nutrients, vitamins and mineral salts to provide at least the minimum physiological requirements now standardized for the average human being.

In all instances where phosphates, sulphates, vitamins, nutrients, etc. are referred to, it must be understood to mean substances of a type compatible with the human digestive tract, and in addition as will be further understood by those skilled in the art will be compositions or materials which are generally well known, accepted and approved by the Bureau of Foods and Drugs of the Department of Health, Education and Welfare.

It will be understood that the invention is not to be limited to the specific construction or arrangement of parts shown but that they may be widely modified within the invention defined by the claims.

What is claimed is:

1. In the method of making a dry milk powder mixture with additives, the step of forming a solution of concentrated skim milk and heating the concentrated skim milk to about 165° F., providing independently of the skim milk solution a solution of at least one additive from the group consisting of phosphate salts, and sulphate salts and vitamin C such that the dry weight of the additive will be not greater than 5% by weight of the final dry milk powder mixture, spray drying the hot concentrated skim milk by subjecting it to a sub-atmospheric pressure to flash off a substantial portion of the moisture content of the skim milk and to form a dry milk powder mixture, and metering the additive solution into the hot concentrated skim milk solution substantially instantaneously with the time that the concentrated skim milk is subjected to the sub-atmospheric pressure with dispersion of the additive in the skim milk whereby a dry milk powder mixture is formed having additive uniformly distributed therein.

2. In the method of making a dry milk powder mixture with additives the steps of forming a solution of concentrated skim milk and heating the concentrated skim milk to about 165° F., forming independently of said skim milk solution a solution of additive from the group consisting of disodium acid phosphates, tetrasodium pyrophosphate, disodium phosphate and hydrates thereof such that the dry weight of the additives will be 2% to 5% by weight of the final dry milk powder mixture and heating the additive solution to about 180° F., spray drying the concentrated skim milk solution at a predetermined quantity and rate to form a dry milk powder mixture, metering the hot additive solution into the skim milk solution in accordance with the quantity and rate being spray-dried substantially instantaneously with the step of spray drying the concentrated skim milk whereby the solution of additive will be uniformly dispersed at the desired concentration in the dry milk powder mixture so formed.

3. In the method of making a dry milk powder mixture will additives the step of forming a solution of concentrated skim milk and heating the concentrated skim milk to about 165° F., providing independently of the skim milk solution a solution of at least one additive from the group consisting of phosphate salts, sulphate salts and vitamin C. for admixture to the concentrated skim milk such that the dry weight of the additives will be 1% to 5% by weight of the final dry milk powder mixture and heating the additive solution to about 180° F., spray drying the hot concentrated skim milk by subjecting it to a sub-atmospheric pressure to flash off a substantial portion of the moisture content of the skim milk solution and to form a dry milk powder mixture, and metering the hot additive solution into the hot concentrated skim milk solution substantially instantaneously with the time that the concentrated skim milk is subjected to the sub-atmospheric pressure during the spray drying thereof whereby a dry milk powder mixture is formed having the additive uniformly dispersed therein.

4. The method of making a dry milk powder mixture with additives as claimed in claim 3 wherein the additive solution is from the group of disodium phosphates and hydrates thereof.

5. The method of making a dry milk powder mixture with additives as claimed in claim 3 wherein the additive solution is formed from calcium sulphate salts.

No references cited.

A. LOUIS MONACELL, *Primary Examiner.*